May 10, 1955     R. A. DUDLEY     2,708,018
STATIC PRESSURE-VISCOSITY DRIVE
Filed Dec. 16, 1949
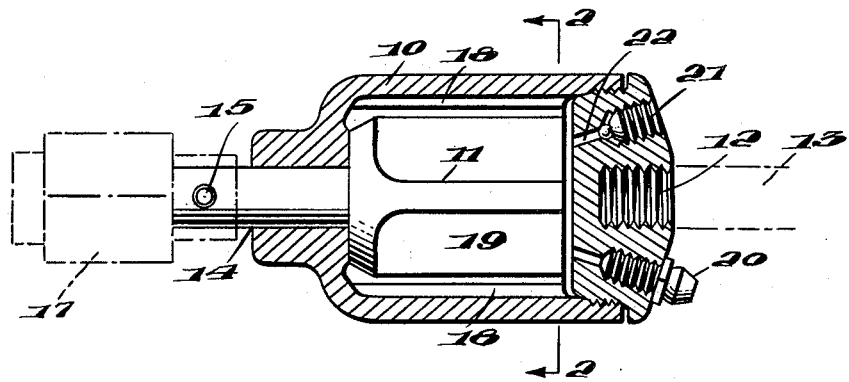
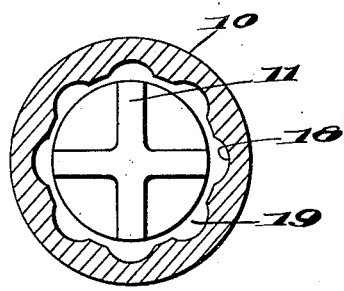 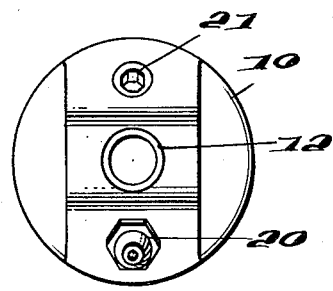
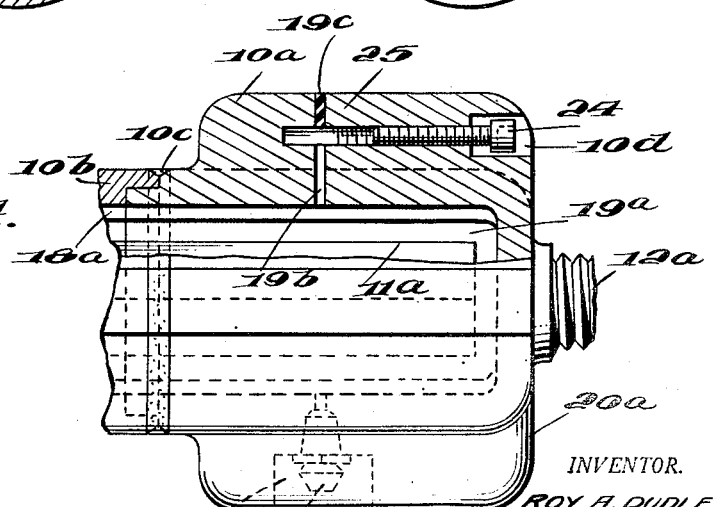
INVENTOR.
ROY A. DUDLEY,
BY
*Hall & Houghton*
ATTORNEYS

United States Patent Office 2,708,018
Patented May 10, 1955

2,708,018

STATIC PRESSURE-VISCOSITY DRIVE

Roy A. Dudley, North Kenova, Ohio

Application December 16, 1949, Serial No. 133,360

3 Claims. (Cl. 192—58)

This invention relates to power clutching and aims generally to improve the same. The invention is based upon my discovery that, contrary to what might be expected, a variation of the internal or static pressure on a so-called incompressible fluid body, for example an oil or grease, varies the intermolecular friction within the body. The invention consists generally in the useful application of this principle especially, but not exclusively, in the field of clutches, shear keys, and mechanical drives.

Among the principal objects of the invention are to provide driving means including a fluid link having its internal or static pressure, and hence its intermolecular friction, set at a predetermined high value; to provide a clutch having its driving and driven members keyed together by the interposition between them of a body of non-compressible fluid under a predetermined or variable high superatmospheric pressure; to provide a clutch or drive comprising a self-healing key consisting of a body of substantially non-compressible fluid under high internal pressure; and to provide a method of and means for transmitting torque from one member to another by keying a body of substantially non-compressible fluid to each of said members and adjusting the viscosity or internal molecular friction of the fluid by adjustment of the internal or static pressure of the fluid to a suitable high value. The incompressible fluid body of oil, grease or other liquid, herein termed a body of "non-compressible coalescent liquid," in contradistinction to a body of discrete solid particles or elements, has the liquid characteristic of coalescence, even when subjected to high superatmospheric static pressure of the order of several hundred atmospheres by which the internal molecular friction of the liquid is so elevated that the coalescent liquid is substantially solidified. Thus when the shearing stress gradient exerted on the substantially rigidified liquid body, by driving and driven members keyed to spaced apart portions of the body, is so great as to cause shearing of the body, it nevertheless reunites itself into a single rigid body as soon as the shearing stress is reduced, thereby constituting in effect a self-healing shear key. The word "keying" as here employed connotes formation of the driving and driven members to present opposed non-circular cross sections to immobilize the contiguous portions of the fluid body relative to said members.

Other objects and advantages of the invention, as will appear from the following detailed description of simple embodiments thereof, include subsidiary provisions and arrangements of parts contributing to the realization of various ones of the principal objects. The invention consists in the useful application of the principle, and in the combinations of steps and arrangements of parts hereinafter described and claimed.

In the accompanying drawings of simple exemplary embodiments of the invention:

Fig. 1 is a longitudinal section through a power drive of the over-load release type incorporation features of the invention.

Fig. 2 is a cross section taken on the line 2—2 of Fig. 1.

Fig. 3 is an end view of Fig. 1.

Fig. 4 is an enlarged detail, partly in longitudinal section, of a modification.

In the form shown in Figs. 1 to 3 the invention is shown applied to a power drive, more particularly a torque-transmitting drive of the torque limiting or overload-releasing clutch type. Such a torque limiting drive may be used for many purposes. One purpose for which it is adapted is as a torque limiting element for motor driven tools such as screw drivers or wrenches, for example. In this application the torque limiting element is adjusted to provide ample torque to drive the screw, self-threading screw, tap, or other element, completely home in the member to which it is being applied, but to release when the driven screw or like element is fully seated in the member, as when the head thereof abuts the surface of the member and thus increases beyond the adjusted limit the torque needed to advance it further or tear the parts. In such application the invention is particularly useful as it may act substantially like a self-healing shear-key, affording a virtually solid keyed drive up to the torque limit set, shearing smoothly and without jar as soon as the set limit is reached, and being ready immediately to drive again for the next ensuing operation.

Referring more particularly to Fig. 1, the unit there shown comprises a driving member and a driven member, herein exemplified by the housing 10 enclosing an impeller 11. The housing in this form is provided with connecting means shown as a threaded coupling element 12 for associating it with a motor driven or other torque transmitting shaft 13; the impeller 11 is provided with a shaft 14 and a coupling means 15 for drivingly associating it with a tool holder, chuck, or other driven element 17; and the housing 10 is sealed about the shaft 14 in any suitable way, as by having a precision running fit therewith, or by the interposition of packing between the housing and the shaft, or between the housing and the abutting face of the impeller, if desired.

The impeller proper, as best shown in Fig. 2, may be cruciform in cross section or of any other form adapted to key with, and not freely rotate within, the fluid keying body hereinafter described, and the housing 10 in this form is also keyed to the fluid keying body, as by the grooving 18 or an equivalent keying means, to prevent it from freely rotating about the fluid keying body.

Means is provided for completely filling the space 19 between the driven and driving member 10, 11 with a so-called non-compressible fluid, for example, a liquid, oil, grease, or silicone grease, to constitute a keying body, and for raising the internal or static pressure of said fluid body until the desired keying action is obtained. In the form of Figs. 1 to 3 this means comprises an inwardly opening check-valved pressure fitting 20 which may be of the type employed with the so-called "Alemite" or "Zerk" pressure gun lubricating systems. In this form it also comprises a stop and relief valve 21, shown as comprising a simple set screw, preferably of the "hex-socketed" or "Allen" type, having at least a slight thread clearance and a spherical or otherwise appropriately shaped end to afford a pressure-tight fit to close the housing vent opening 22.

With this arrangement a grease, or like relatively viscous fluid, may be forced into the housing by any suitable form of high pressure lubricator or the like, the vent 22 being left open during the filling operation. When the chamber or keying space 19 between the members 10 and 11 has been completely filled with fluid, as evidenced by the smooth non-explosive discharge of the grease from the vent opening 22, the plug 21 may be screwed home therein. The internal or static pressure in the keying fluid is then raised to a high super-atmospheric pressure.

In the form of Fig. 1 means is provided for effecting the increase in internal pressure, since the check valved fitting 20 provides for forcing in a small additional quantity of grease therethrough, either from a controlled source, or by one or more strokes of a high pressure manually operated lubricating gun operated until a resistance is reached corresponding to the desired pressure. The chamber 19 being completely filled with the substantially non-compressible fluid and being substantially void of any gaseous content only a very small additional quantity of the non-compressible fluid can be driven into it, and even though this fluid is an oil, a grease, a silicone grease, or of a like lubricant nature, when its internal or static pressure is raised to the order of 2,000 to 10,000 pounds per square inch, its viscosity or intermolecular friction is so increased that it becomes in effect a shear-key interposed between the members 10 and 11, the resistance to shear of which is substantially proportional to the internal pressure in the fluid and to the effective thickness of the fluid body between the keyed members determining the shear gradient across it.

That the holding power or shear resisting ability of the device is due to the change in character of the so called non-compressible fluid at high pressure, and not merely to end thrust, is readily demonstrated. Thus, increasing the keying of the grease to the housing, increases the holding power with the same pressure, and with no change in the end thrust area of the impeller. Similarly, the wider the clearance is made between the housing and the edges of the impeller, the greater is the holding power with the same pressure, up to about a one-eighth inch clearance with a one and one-quarter inch diameter. Moreover, if a small quantity of air is left in the housing, and the same pressure applied, the holding power is not obtained. In such case, when torque is applied, the air seems to distribute itself in the region of shear and to produce a cleavage in that region between grease rotating with the impeller and grease rotating with the housing, and no substantial torque transmitting power can be obtained, even though the pressure and end thrust of the impeller remain the same. It is therefore clear that the change in the shearability of the fluid with increase in pressure, which may be regarded as an intermolecular friction or viscosity change, is the principal and essential factor of the self-healing key afforded by this invention.

Referring again to the form of Figs. 1 to 3 such form, applied to torque limiting in tool drives and the like, may employ any of a large number of fluids, but preferably employs a mineral oil such as lubricating oil, pressure lubricant, semifluid cup grease, or a mixed or synthetic lubricant such as silicone grease. The use of a lubricant grease is highly desirable, as it lubricates and reduces friction between the close surfaces, as between the shaft and seal, or between the housing and impeller end in those instances in which, as in Fig. 1, end thrust is not balanced out. The very thin films of grease between these non-keyed surfaces seemingly act in a lubricating rather than a keying capacity. A wide selection of fluids may be drawn upon depending on the torque limit and pressure desired, especially in tool driving and like operations in which the device is not subjected to such prolonged slippage as to cause any very substantial rise in temperature. Where prolonged slippage and wide temperature variations are contemplated, a silicone grease is preferred, since this grease maintains very constant its viscosity at atmospheric pressure over a temperature range of from 0° F. to 300° F., and seems also to maintain a very constant holding power despite changes in temperature at high super-atmospheric pressures.

When pourable oils are used, the initial filling may be effected by pouring the same into the housing and thereafter closing the housing and applying pressure to the fluid.

Where close adjustability, or precise and easy adjustability of the internal or static pressure of the keying fluid is desired, the means for applying a high super-atmospheric static pressure to the fluid may include a means for adjusting the volume of the space filled by the fluid body, an exemplary form of which is shown in Fig. 4. In this embodiment the housing is formed of two parts 10a, 10b press fit assembled and welded together at 10c. The coupling means 12 for purpose of illustration, is here shown as a male threaded element whereas this means is shown in Fig. 1 as a female threaded element. The casing, as in Fig. 1, may be provided with a filling plug, which may take the form of an inwardly opening check valved fitting 20a similar to the fitting 20, and which may be recessed into the housing as at 20b to eliminate rotating projections. The housing 10a also may be provided with pressure relieving means, which may be similar to the stop and vent valve 21, or which may be combined with a pressure adjusting means now to be described.

The pressure adjusting means in the form shown, comprises a volume varying device in the form of a finely threaded machine screw 24, preferably "Allen" headed, as shown, adjustable longitudinally in a bore 25 which communicates with the chamber 19a by way of a bore 19b welded over or otherwise plugged at its outer end 19c. The screw 24, having a close fit in the threaded bore 25, after threading therein for a substantial distance may act as a stop valve equivalent to the valve 21 of Fig. 1 when it is desired to omit the latter. Alternatively the fitting 20a may be backed off to allow escape of fluid while the screw 24 is being run into bore 25 for a substantial distance, with the bore 25 and chamber 19a, 19b completely filled with fluid. Or if desired, a stop and relief valve similar to the valve 21 of Fig. 1 may be employed in the form of Fig. 4 in addition to the elements 20a and 24. In either event, when the chamber 19a, 19b has been completely filled with the fluid and sealed, further advance of the screw 24 may be employed to reduce the volume of the enclosed space and apply a desired high internal or static pressure to the fluid keying body. Also for the purpose of avoiding sharp rotating projections, the head end of the screw 24 may be recessed in the housing body 10a, as shown at 10d. As above indicated such volume adjusting means may be employed with the form of the invention shown in Figs. 1 to 3.

While for purposes of illustration particular forms of non-circular or keying cross sections of the housing 10 and impeller 11 have been shown in Figs. 1 to 3, other abutment presenting or keying forms may be employed. For example, the impeller may have simply a square cross section as indicated at 11a in Fig. 4.

From the foregoing description it will be apparent that the exemplary embodiments herein shown and described are illustrative and not restrictive of the invention, the scope of which is defined in the appended claims, and that modifications which come within the meaning or range of equivalency of the claims are intended to be included therein.

I claim as my invention:

1. Torque transmitting means comprising coaxial rotatable drive members, one of said members comprising a sealed housing enclosing the other drive member, the housing and the enclosed portion of the other drive member having opposed surfaces spaced apart and defining between them a space of substantial thickness, a body of non-compressible coalescent liquid confined within and entirely filling said space, said liquid body being placed under a high super-atmospheric static pressure of the order of several hundred atmospheres by which the internal molecular friction of the liquid body is so elevated that the coalescent liquid is substantially solidified and forms a rigid driving connection between the drive members constituting in effect a self-healing shear key, said torque transmitting means further comprising means for adjusting the high superatmospheric pressure of said liquid filling to adjust its internal molecular friction and its resistance to shear and for bleeding any trapped air from said housing, said means comprising a valved pressure fitting opening into said housing and means forming a valve controlled vent leading from said housing.

2. Torque transmitting means comprising coaxial rotatable drive members, one of said members comprising a sealed housing enclosing the other drive member, the housing and the enclosed portion of the other drive member having opposed surfaces spaced apart and defining between them a space of substantial thickness, a body of non-compressible coalescent liquid confined within and entirely filling said space, said liquid body being placed under a high super-atmospheric static pressure of the order of several hundred atmosphere by which the internal molecular friction of the liquid body is so elevated that the coalescent liquid is substantially solidified and forms a rigid driving connection between the drive members constituting in effect a self-healing shear key, said torque transmitting means further comprising means for adjusting the high super-atmospheric pressure of said liquid filling to adjust its internal molecular friction and its resistance to shear, said means comprising an inwardly opening check valved pressure fitting and a stop valve for relief of the applied pressure.

3. Torque transmitting means comprising coaxial rotatable drive members, one of said members comprising a sealed housing enclosing the other drive member, the housing and the enclosed portion of the other drive member having opposed surfaces spaced apart and defining between them a space of substantial thickness, a body of non-compressible coalescent liquid confined within and entirely filling said space, said liquid body being placed under a high super-atmospheric static pressure of the order of several hundred atmosphere by which the internal molecular friction of the liquid body is so elevated that the coalescent liquid is substantially solidified and forms a rigid driving connection between the drive members constituting in effect a self-healing shear key, said torque transmitting means further comprising means for adjusting the high super-atmospheric pressure of said liquid filling to adjust its internal molecular friction and its resistance to shear, said means comprising an inwardly opening check valved pressure fitting, a stop valve for relief of the applied pressure, and a means for adjusting the volume of the space within the housing to vary the internal static pressure in said liquid body.

References Cited in the file of this patent

UNITED STATES PATENTS

| 1,746,148 | Eaton | Feb. 4, 1930 |
| 1,962,367 | Smythe | June 12, 1934 |
| 2,125,617 | Niemann | Aug. 2, 1938 |
| 2,408,501 | Wright | Oct. 1, 1946 |

FOREIGN PATENTS

| 646,573 | Germany | Mar. 14, 1935 |